(12) United States Patent
Croyle (10) Patent No.: US 10,234,568 B2
(45) Date of Patent: Mar. 19, 2019

(54) GNSS VEHICLE LOCATION INVOLVING OVERLAPPING ROADS

(71) Applicant: GM Global Technology Operations LLC, Detroit, MI (US)

(72) Inventor: Steven R. Croyle, Bingham Farms, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 15/152,856

(22) Filed: May 12, 2016

(65) Prior Publication Data
US 2017/0329019 A1 Nov. 16, 2017

(51) Int. Cl.
| | | |
|---|---|---|
| *G01S 19/49* | (2010.01) | |
| *G01C 21/16* | (2006.01) | |
| *G01C 21/36* | (2006.01) | |
| *G01S 19/50* | (2010.01) | |
| *G01S 19/52* | (2010.01) | |
| *G01C 21/30* | (2006.01) | |

(52) U.S. Cl.
CPC ............ *G01S 19/49* (2013.01); *G01C 21/165* (2013.01); *G01C 21/30* (2013.01); *G01C 21/3667* (2013.01); *G01S 19/50* (2013.01); *G01S 19/52* (2013.01)

(58) Field of Classification Search
CPC ......... G01S 19/48; G01C 21/32; G01C 21/26; G01C 21/3667; G01C 21/3697; G06F 17/30241; G06F 3/04817; B60W 2550/10; B60W 30/09; G06Q 10/0635; G06Q 50/28; G08G 1/165

USPC ......... 701/1, 22, 37, 93, 118, 301, 409, 428, 701/450, 454, 532, 533, 41, 472, 25, 701/31.4, 117, 423, 445, 469, 470; 705/4, 7.25, 13, 1; 342/357.26, 36, 342/357.23, 357.33, 357.39, 357.61; 702/141, 142, 152; 455/418, 456.1; 340/953, 961; 404/1
See application file for complete search history.

(56) References Cited

U.S. PATENT DOCUMENTS

| | | | | |
|---|---|---|---|---|
| 5,867,804 A | * | 2/1999 | Pilley ..................... | G01C 23/00 340/961 |
| 6,006,158 A | * | 12/1999 | Pilley ..................... | G01C 23/00 340/953 |
| 6,182,005 B1 | * | 1/2001 | Pilley ..................... | G01C 23/00 342/36 |
| 6,532,432 B1 | * | 3/2003 | Nagatsuma ............ | G01C 22/02 702/142 |
| 2002/0161513 A1 | * | 10/2002 | Bechtolsheim .... | G01C 21/3667 701/454 |

(Continued)

*Primary Examiner* — Abby Y Lin
*Assistant Examiner* — Sanjeev Malhotra
(74) *Attorney, Agent, or Firm* — Reising Ethington P.C.; David Willoughby (57) ABSTRACT

A system and method of determining a vehicle location where roads have different elevations and at least partially overlap. The method carried out by the system includes: receiving a plurality of Global Navigation Satellite System (GNSS) satellite signals at a vehicle; determining a vehicle location and a vehicle velocity including an up velocity based on the received GNSS signals; identifying a plurality of roads, within a range of the vehicle location, at least one of which has a different elevation than the other road(s); and selecting at least one of the plurality of roads within the range based on the up velocity component.

9 Claims, 3 Drawing Sheets

(56) References Cited

U.S. PATENT DOCUMENTS

| | | | |
|---|---|---|---|
| 2004/0225432 A1* | 11/2004 | Pilley | G01C 23/00 701/117 |
| 2005/0267676 A1* | 12/2005 | Nezu | B60K 35/00 701/532 |
| 2007/0112475 A1* | 5/2007 | Koebler | B60L 3/12 701/1 |
| 2008/0015743 A1* | 1/2008 | Haug | B60T 7/22 701/1 |
| 2008/0039991 A1* | 2/2008 | May | G05D 1/024 701/25 |
| 2009/0052983 A1* | 2/2009 | Goj | E01C 1/04 404/1 |
| 2009/0093959 A1* | 4/2009 | Scherzinger | G01C 21/165 701/470 |
| 2009/0177382 A1* | 7/2009 | Alles | G01C 25/00 701/532 |
| 2010/0082248 A1* | 4/2010 | Dorum | G01C 21/32 701/533 |
| 2010/0082252 A1* | 4/2010 | Asanuma | G08G 1/005 701/301 |
| 2010/0164789 A1* | 7/2010 | Basnayake | G01S 5/0072 342/357.23 |
| 2011/0117903 A1* | 5/2011 | Bradley | H04M 1/6075 455/418 |
| 2011/0288771 A1* | 11/2011 | Mazlum | G01S 19/50 701/469 |
| 2012/0221244 A1* | 8/2012 | Georgy | G01C 21/165 701/472 |
| 2012/0232787 A1* | 9/2012 | Kunath | G01C 21/3461 701/423 |
| 2012/0245849 A1* | 9/2012 | Spindler | G01C 21/32 701/533 |
| 2012/0323474 A1* | 12/2012 | Breed | B60W 30/04 701/117 |
| 2013/0103259 A1* | 4/2013 | Eng | B60G 17/019 701/37 |
| 2013/0196688 A1* | 8/2013 | Lu | G01S 19/19 455/456.1 |
| 2013/0197857 A1* | 8/2013 | Lu | G01S 19/19 702/141 |
| 2013/0261958 A1* | 10/2013 | Herron | G07B 15/02 701/428 |
| 2013/0332063 A1* | 12/2013 | Pirwani | G01C 21/32 701/409 |
| 2014/0025298 A1* | 1/2014 | Spindler | G01C 21/32 701/533 |
| 2014/0046584 A1* | 2/2014 | Aben | G01C 21/3461 701/428 |
| 2014/0129136 A1* | 5/2014 | Celia | G01C 21/00 701/445 |
| 2014/0152494 A1* | 6/2014 | MacGougan | G01S 19/03 342/357.39 |
| 2014/0195102 A1* | 7/2014 | Nathanson | G07C 5/0808 701/31.4 |
| 2014/0358414 A1* | 12/2014 | Ibrahim | G01C 21/10 701/118 |
| 2015/0057831 A1* | 2/2015 | Finlow-Bates | G08G 1/09626 701/1 |
| 2015/0116150 A1* | 4/2015 | Garin | G01S 19/22 342/357.61 |
| 2015/0294422 A1* | 10/2015 | Carver | G06Q 40/08 705/4 |
| 2015/0325059 A1* | 11/2015 | Mart Nez Alvaro | G07B 15/06 705/13 |
| 2015/0336546 A1* | 11/2015 | Al-Zahrani | G08G 1/165 701/93 |
| 2015/0338524 A1* | 11/2015 | Ben Moshe | G01S 19/50 342/357.33 |
| 2015/0353083 A1* | 12/2015 | Hasberg | G06K 9/00805 701/1 |
| 2016/0011318 A1* | 1/2016 | Cohen | G01S 19/05 342/357.26 |
| 2016/0040992 A1* | 2/2016 | Palella | G01C 21/165 702/152 |
| 2016/0048788 A1* | 2/2016 | Martin | G06Q 10/06315 705/7.25 |
| 2016/0061610 A1* | 3/2016 | Meyer | G01C 21/26 701/22 |
| 2016/0096519 A1* | 4/2016 | Goudy | B60W 10/20 701/41 |
| 2016/0161265 A1* | 6/2016 | Bagheri | G01C 21/32 701/450 |
| 2016/0217399 A1* | 7/2016 | Roelofs | G06Q 10/0635 |
| 2016/0282128 A1* | 9/2016 | Zeng | B60W 30/0956 |
| 2016/0318445 A1* | 11/2016 | Sugimoto | B60Q 9/008 |
| 2017/0016740 A1* | 1/2017 | Cui | G01C 21/30 |
| 2017/0067990 A1* | 3/2017 | Reed | G01S 17/50 |
| 2017/0067999 A1* | 3/2017 | Chhokra | G01S 19/12 |
| 2017/0068001 A1* | 3/2017 | Chhokra | G01S 19/40 |
| 2017/0074964 A1* | 3/2017 | Xu | G01S 19/48 |
| 2017/0124775 A1* | 5/2017 | Breed | G07B 15/00 |

* cited by examiner

GNSS VEHICLE LOCATION INVOLVING OVERLAPPING ROADS

TECHNICAL FIELD

The present invention relates to Global Navigation Satellite System (GNSS) navigation and, more particularly, to determining a vehicle location where roads have different elevations and at least partially overlap.

BACKGROUND

Modern vehicles commonly include hardware that determines the location of a vehicle and then correlates that location with a position on a roadmap. Early GNSS navigation included a purposefully-inserted error component that left received GNSS signals somewhat inaccurate. Rather than using GNSS signals for navigation, vehicles relied on a dead-reckoning system that received information from a plurality of vehicle sensors to determine vehicle speed and direction. Given a vehicle's initial position, the vehicle could calculate a displacement vector that is added to the initial position to determine the vehicle's new location. The new location can then be identified on a two-dimensional map using map-matching techniques that correlate the position of the vehicle with a road included on a map.

As vehicle navigation systems evolved, vehicles began augmenting the dead-reckoning system with GNSS receivers that received signals from a plurality of space-based GNSS satellites, such as those implementing the global positioning system (GPS) system. Present vehicle-based GNSS receivers calculate vehicle position, speed, or direction in a two-dimensional plane as a vehicle moves along a road. That is, the GNSS receivers calculate latitude and longitude coordinates, speed, and a directional heading and can translate this data into a vehicle position on a two-dimensional map. The GNSS receivers have been used alone or with location information generated by the dead-reckoning system to determine vehicle location.

In most areas, the dead-reckoning augmented with information from the GNSS receiver provides an accurate indication of vehicle location. However, some areas have roads that overlap each other on the two-dimensional plane. For example, some roads may have a lower road and an upper road that is elevated and at least partially overlaps the lower road. A vehicle located on the upper road would have similar latitude and longitude coordinates as a vehicle located on the lower road. When current vehicle-based GNSS receivers or dead-reckoning systems determine a vehicle location in the two-dimensional plane, this location does not indicate whether the vehicle is on the upper or lower road. Road geometry and navigational directions can vary depending on whether a vehicle is on an upper road or a lower road. For example, exits may lead from the right side of the road versus the left side of the road and without accurately identifying the correct road on which the vehicle is located, the driver could receive inaccurate directions.

SUMMARY

According to an embodiment, there is provided a method of determining a vehicle location involving roads having different elevations that at least partially overlap. The method of receiving a plurality of Global Navigation Satellite System (GNSS) satellite signals at a vehicle; determining a vehicle location and a vehicle velocity including an up velocity based on the received GNSS signals; identifying a plurality of roads, within a range of the vehicle location, at least one of which has a different elevation than the other road(s); and selecting at least one of the plurality of roads within the range based on the up velocity component.

According to another embodiment, there is provided a vehicle that includes a Global Navigation Satellite System (GNSS) receiver configured to receive a plurality of GNSS satellite signals at the vehicle and determine a vehicle location and a vehicle velocity including an up velocity based on the received GNSS signals; and a microprocessor configured to receive the vehicle location and the up velocity, identify a plurality of roads within a range of the vehicle location at least one of which has a different elevation than the other road(s) by accessing a map matching module, and select at least one of the plurality of roads within the defined range based on the up velocity.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The system and method described below determines vehicle location in an area having roads that partially or completely overlap each other. As discussed above, some areas may have roads that are stacked in some locations such that one road has a different elevation than one or more other roads yet occupies at least some of the same space as the road(s) when they are viewed together on an x-y plane. Where roads have different elevations and overlapping exists, one latitude and longitude coordinate set can identify a location at which two different roads are present. Examples of these roads include Wacker Drive in Chicago, Ill. and the Verrazano Bridge in New York City, N.Y. connecting Staten Island and Brooklyn. A GNSS receiver determines whether the vehicle begins using a road having a lower elevation or a higher elevation based on a three-dimensional velocity including an up velocity component. The up velocity component can indicate whether the vehicle is moving toward a higher elevation or lower elevation as the vehicle transitions to an upper road or lower road, respectively. For example, a positive up velocity component can indicate that the vehicle has begun travelling on a ramp that leads to a road having a higher elevation than the present road. Conversely, a negative up velocity component can indicate that the vehicle has begun travelling on a ramp that leads to a road having a lower elevation. The up velocity of the vehicle can be used to select a road from a plurality of roads at least one of which has a different elevation than the other road(s) and exist at a common latitude and longitude coordinate pair.

Accelerometers have been used in the past to indicate whether a vehicle is moving up or down. But accelerometers are challenging to robustly implement in vehicles for this purpose. For instance, accelerometers have a tendency to drift over time and require regular calibration to maintain accuracy. Also, accelerometers rely on precise positioning within the vehicle further complicating installation of accelerometers as part of vehicle assembly. If an accelerometer is not precisely aligned with respect to a vertically-oriented sensing axis, the accelerometer may not provide accurate output. And the use of accelerometers involves additional calculations not necessary when using the up velocity. Acceleration calculations based on output from an accelerometer involves subtracting the presence of gravity from the accelerometer output that is unnecessary when using the up velocity. In addition, accelerometers may indicate change in upward or downward position based on two integrations of the acceleration output. The up velocity output by the GNSS receiver exists as a byproduct of the three-dimensional location calculation and does not require the additional processing consumed by the accelerometer.

The up velocity can not only improve the accuracy with which we determine whether the vehicle begins moving upwards or downwards but can also be used to calibrate vehicle accelerometers to maintain their accuracy. Output from a vehicle accelerometer can be compared with up velocity values and deviations beyond a particular threshold can serve as guidelines for calibrating the accelerometer. These concepts will be discussed in greater detail below.

Communications System—

Figure 1:
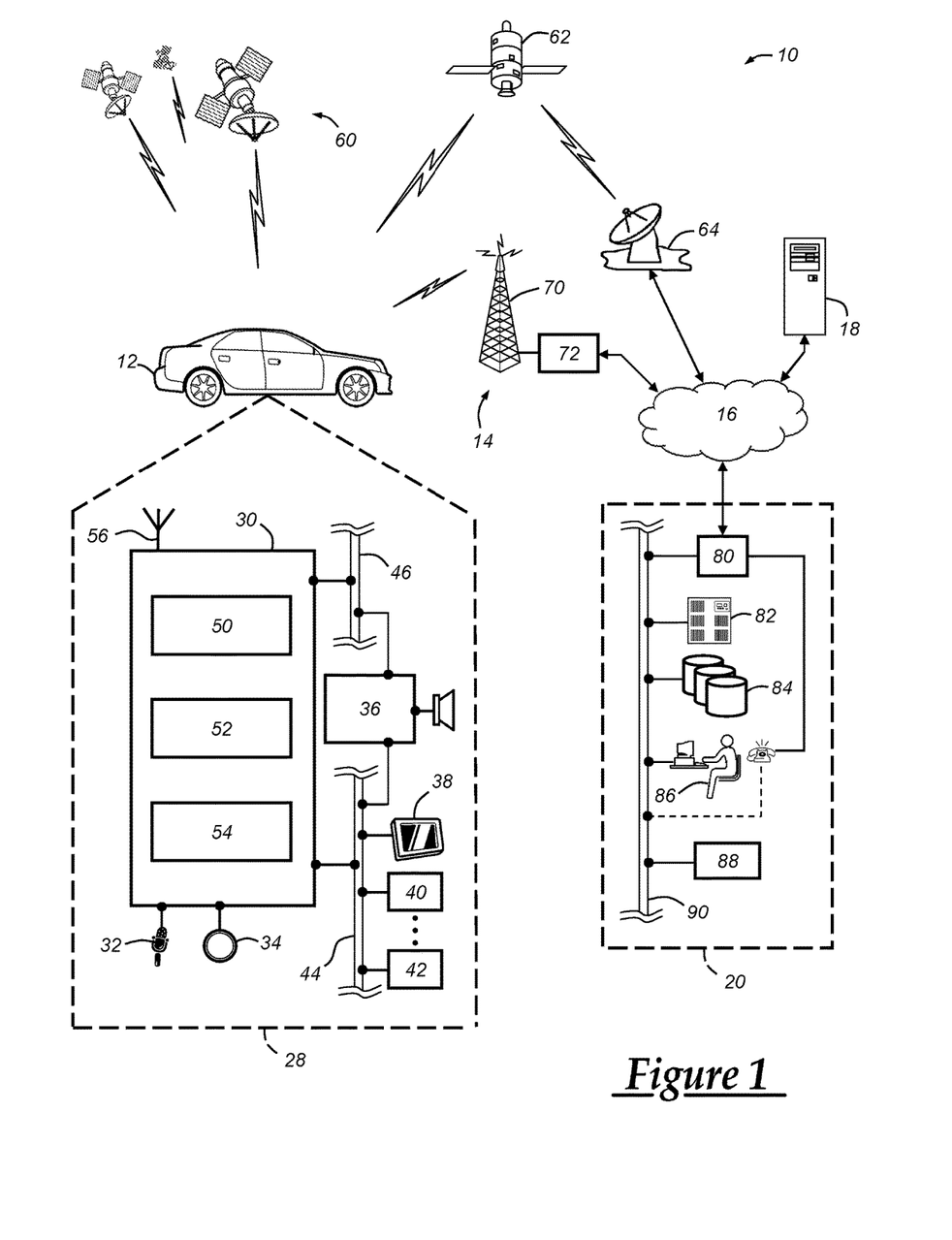
FIG. 1 is a block diagram depicting an embodiment of a communications system that is capable of using the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a navigation module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM, CDMA, or LTE standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, including short range wireless communication (SRWC) such as any of the IEEE 802.11 protocols, WiMAX, ZigBee™ Wi-Fi direct, Bluetooth, or near field communication (NFC). When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

Figure 2:
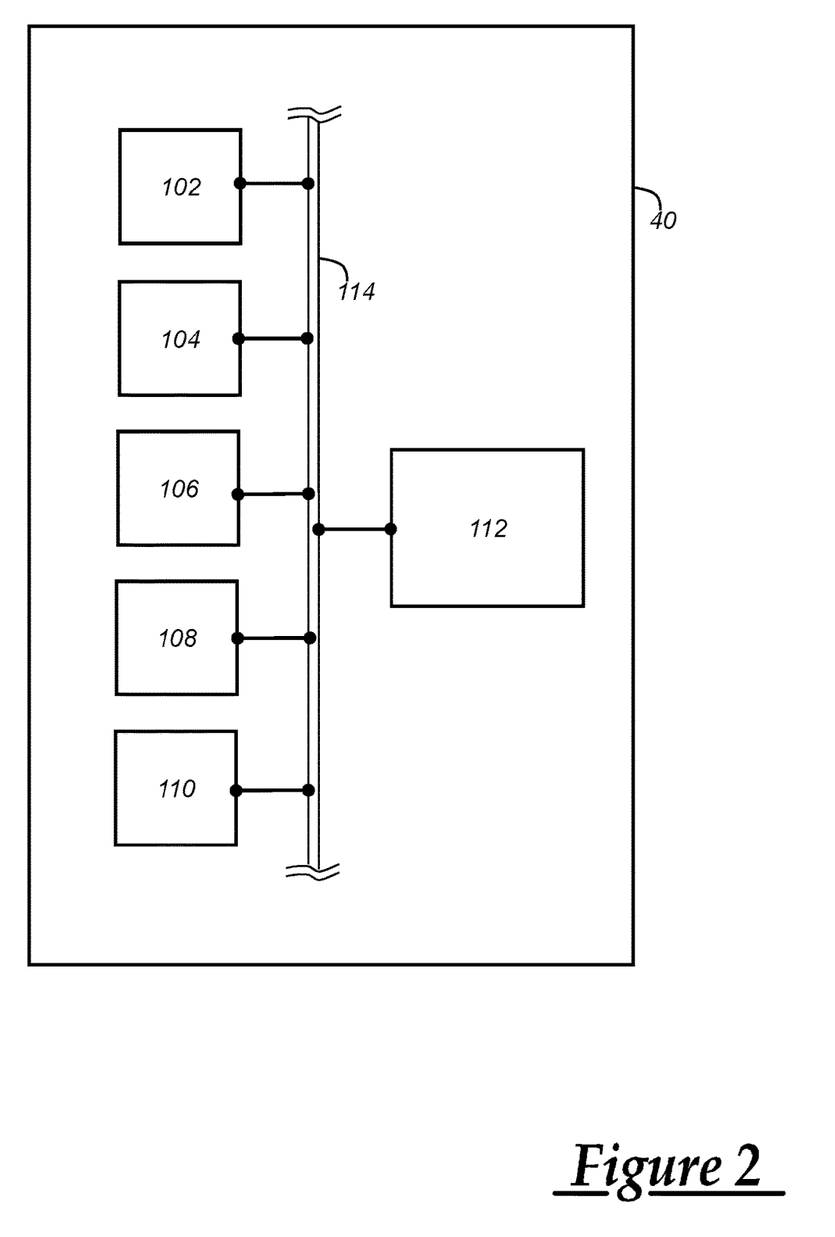
FIG. 2 is a block diagram depicting an embodiment of a navigation module capable of using the method disclosed herein.

Navigation module 40 includes a number of elements used to determine a vehicle location both in terms of latitude and longitude coordinates and also how the latitude and longitude coordinates correlate to one or more roads on a map. The navigation module 40 includes a GNSS receiver 102, one or more accelerometers 104, a speed sensor 106, a heading sensor 108, a mapping database 110, and a microprocessor 112. These elements are shown in FIG. 2 to be communicatively linked within the navigation module 40 via a module bus 114.

The GNSS receiver 102 can use one of a variety of different GNSS standards. In the implementation described herein, the GNSS receiver will be described in terms of the Global Positioning System (GPS) standard but the system and method could be implemented using other standards, such as the Global Navigation Satellite System (GLONASS). The GNSS receiver 102 receives radio signals from a constellation 60 of GPS satellites shown in FIG. 1. From these signals, the GNSS module 102 can determine vehicle position that is used for providing navigation and other position-related services to the vehicle driver. The GNSS receiver 102 can generate a three-dimensional position including latitude, longitude, and height in addition to a three-dimensional vehicle velocity including north, east, and up velocity components. An accurate time value is output by the GNSS receiver 102 as well. The GNSS receiver 102 can determine the three-dimensional position of the vehicle 12 based on the radio signals received from three or more GPS satellites using triangulation techniques. However, the height component of the determined three-dimensional position may have a large enough level of uncertainty that makes it unsuitable for determining whether the vehicle 12 is on an upper road or a lower road. For instance, the height component generally has a resolution to within 10 meters (m). Given that the distance between an upper road and a lower road can be less than 10 m, the navigation module 40 cannot solely rely on the height component.

In contrast, the up velocity component of the three-dimensional vehicle velocity generated by the GNSS receiver 102 can indicate with a high degree of specificity whether the vehicle 12 is transitioning between roads having different elevations. For example, the vehicle 12 may be using a ramp having a slope. As the vehicle 12 begins travelling on the ramp, the up velocity can become non-zero thereby indicating that a transition between roads having different elevations has begun. A positive up velocity can indicate that the vehicle 12 is beginning to transition from a lower road to an upper road while a negative up velocity can indicate the beginning of a transition from an upper road to a lower road.

The accelerometer 104 can measure acceleration as well as changes in acceleration based on vehicle motion and translate those detected changes into data that it outputs. As the vehicle 12 sits motionless, the accelerometer 104 measures the force gravity exerts on the vehicle 12. However, as the vehicle 12 moves, the accelerometer 104 can detect deviations from gravitational forces as the vehicle 12 moves upwards or downward. These upwards and downwards movements can occur when the vehicle 12 moves from a lower road to an upper road having a higher elevation than the lower road or vice versa. A bias is subtracted from accelerometer output, which can then be multiplied by a scale factor. The scale factor is a stable value but the bias can drift with the passage of time and variation of temperature. The microprocessor 112 can receive acceleration output, compare the output with up velocity values it receives, and adjust the bias as needed.

Changes in vehicle height can be determined by calculating a second integration of the acceleration values output by the accelerometer 104. The accelerometer 104 can detect that the vehicle 12 is motionless and also determine that the pitch of the vehicle 12 has changed. Various implementations of accelerometers are possible. In one implementation, the accelerometer 16 can be a two-axis accelerometer mounted on a printed circuit board (PCB). One possible accelerometer 104 that can be used is produced by MEMSIC and known by model number MXC6235xQB. Other accelerometers measuring movement in one or more axes are possible.

The speed sensor 106 can be implemented using a sensor physically linked to one or more wheels of the vehicle 12 and output data that indicates a vehicle speed. The heading sensor 108 can be implemented using a magnetic sensor module available in both two- and three-axis versions that output directional data. The speed sensor 106 and heading sensor 108 can provide data including the vehicle speed and vehicle direction, respectively, over the module bus 114 to the microprocessor 112. These sensors are known in the art.

The mapping database 110 includes computer readable memory containing map data that facilitates identifying a vehicle location on a map. The microprocessor 112 can execute a map-matching algorithm using a vehicle location that identifies a map including the vehicle location as well as the road on which the vehicle 12 is located. The position of the vehicle 12 on that road can also be resolved. The computer-readable memory can store augmented maps, such as Advanced Driver Assistance System (ADAS) level maps that include road slope information indicating a slope of the road at any particular location along the road. The microprocessor 112 and module bus 114 can be implemented in a variety of ways. For example, the microprocessor 112 can be any type of device capable of processing electronic instructions including microprocessors, microcontrollers, host processors, controllers, vehicle communication processors, and application specific integrated circuits (ASICs). It can be a dedicated processor used only for the navigation module 40 or can be shared with other vehicle systems. The microprocessor 112 executes various types of digitally-stored instructions, such as software or firmware programs stored in its own internal memory or stored externally. The module bus 114 can be implemented using one of a variety of known networking techniques.

The navigation services can be provided using a dedicated in-vehicle GNSS receiver 102 (which can be part of navigation module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the navigation module 40 from the call center 20 via the telematics unit 30. Navigation information can be presented on the display 38 (or other display within the vehicle) or can be presented verbally such as is done when supplying turn-by-turn navigation.

Apart from the audio system 36 and navigation module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbutton(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method—

Figure 3:
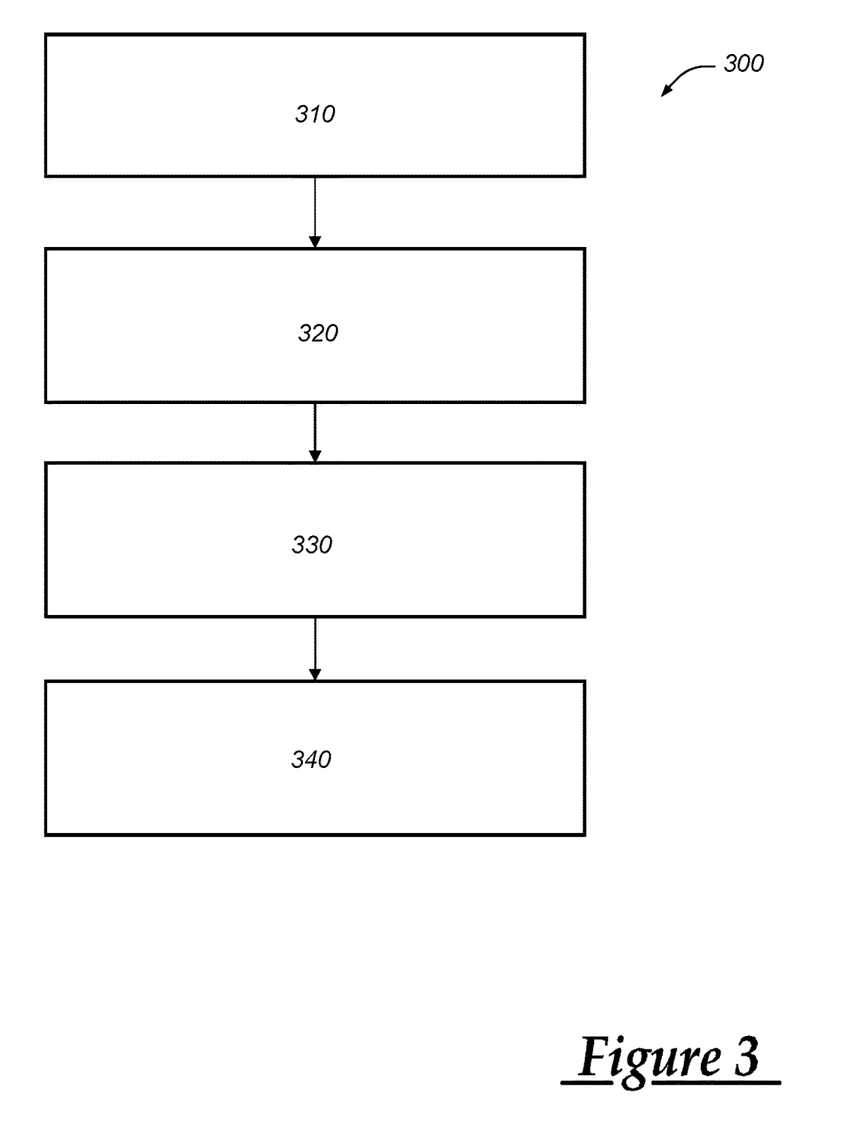
FIG. 3 is a method of determining a vehicle location where roads have different elevations and at least partially overlap.

Turning now to FIG. 3, there is shown an embodiment of a method (300) of determining a vehicle location where roads have different elevations and at least partially overlap along with a vehicle velocity, including an up velocity. The method 300 begins at step 310 by receiving a plurality of Global Navigation Satellite System (GNSS) satellite signals at the vehicle 12 and determining a vehicle location that can include a latitude and longitude pair and a height. Apart from the vehicle location, the GNSS receiver 102 can generate a three-dimensional velocity based on the received GNSS signals including a north velocity, an east velocity, and an up velocity all of which can be positive or negative. In general, the up velocity in a GNSS System can be computed from either taking two snapshots of a satellite range measurement in close succession, computing a delta range measurement, or from Doppler measurements from a satellite. The combination of these can be used to compute a vehicle velocity, separated from the velocity of the individual satellites. In addition, the GNSS receiver 102 can generate a time value. The method 300 proceeds to step 320.

At step 320, the microprocessor 112 determines whether the up velocity is non-zero. The microprocessor 112 can receive the up velocity of the vehicle 12 from the GNSS receiver 102, determine if the value is positive or negative. When the up velocity is positive or negative, the microprocessor can determine whether or not the up velocity exceeds a threshold value. In one implementation, a threshold value can be set at +/−1 degree above/below which the microprocessor 112 can determine that the vehicle 12 is moving up/down a ramp that connects roads of different heights. The method 300 proceeds to step 330.

At step 330, the microprocessor 112 determines whether entrance or exit ramps exist within a range of the vehicle 12 and, if so, computes a slope from the up velocity. The up velocity and the east and north velocities can be combined to compute a three dimensional velocity vector. This three dimensional velocity vector can be integrated to compute a three dimensional displacement vector (one step less than using an accelerometer which is integrated twice to get a displacement and then used with east/north displacement to calculate a slope). It should be noted that the east and north velocity or the vehicle displacement can be a combination of GNSS+Vehicle/Inertial sensors, such as an odometer or Gyroscope. The three dimensional displacement vector can show the change in movement in the up direction vs. change in displacement in the East/North plane, which is a slope in the up direction. The microprocessor 112 can access the mapping database 110 and select one or more maps based on the latitude and longitude coordinates of the vehicle 12. The selected maps can include information identifying all of the ramps included in the maps, if any, and roads that have different elevations. The microprocessor 112 can determine if the maps include any ramps. If not, the method 300 ends. Otherwise, the microprocessor 112 can calculate the slope of the vehicle 12 and then compare the calculated slope with the slope of each ramp identified by the map. The method 300 proceeds to step 340.

At step 340, a plurality of roads are identified within a range of the vehicle location at least one of which has a different elevation than the other road(s) and at least one of those roads are selected based on the up velocity component. When the calculated slope of the vehicle 12 matches a ramp, the location of the vehicle 12 can be set on one of the roads having different elevations that connects with the matching ramp. For example, if the slope of vehicle travel is positive and it matches the slope of a ramp attached to an upper or elevated road, the microprocessor can set the vehicle position on the upper road on a map and present this map to a vehicle occupant via display 34. Navigational guidance or instructions can then be delivered based on a determination that the vehicle 12 is travelling on the upper road. And if the slope of vehicle travel is negative and it matches the slope of a ramp attached to an lower road relative to other roads, the microprocessor 112 can set the vehicle position on the lower road on a map and present this map to a vehicle occupant via display 34. The method 300 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of determining a location of a vehicle using a Global Navigation Satellite System (GNSS) installed in the vehicle, wherein the vehicle location involves roads having different elevations that at least partially overlap, comprising the steps of:
    (a) receiving a plurality of GNSS satellite signals at a GNSS receiver installed in the vehicle;
    (b) using the GNSS receiver, determining the location of the vehicle in a two-dimensional plane, wherein the location includes latitude and longitude coordinates based on the received GNSS signals;
    (c) selecting one or more maps from a map database based on the latitude and longitude coordinates;
    (d) using the GNSS receiver, generating a three-dimensional velocity vector of the vehicle based on the received GNSS signals, wherein the three-dimensional velocity vector includes an up velocity component;
    (e) detecting a change in vehicle elevation based on a value of the up velocity component;
    (f) in identifying from the maps selected in step (c) a plurality of roads, within a range of the vehicle location, at least one of which has a different elevation than the other road(s) and at least partially overlaps with at least one of the other road(s) in the two-dimensional plane at common latitude and longitude coordinates;
    (g) determining a slope of the vehicle travel by calculating a three-dimensional displacement vector of the vehicle based on the three-dimensional velocity vector;
    (h) determining which of the identified plurality of roads having common latitude and longitude coordinates the vehicle is traveling by comparing the slope of the vehicle calculated in step (e) to a slope for each of the plurality of roads identified in step (f);
    (i) setting a vehicle position in the vehicle GNSS based on the comparison in step (h); and
    (j) providing navigational services to a vehicle occupant based on the vehicle position set in step (i).

2. The method of claim 1, wherein the vehicle location is a three-dimensional vehicle location.

3. The method of claim 1, wherein the plurality of roads are selected based on one or more ramps within the range of the vehicle location.

4. The method of claim 1, further comprising the step of determining whether the up velocity component is non-zero.

5. The method of claim 3, further comprising the step of comparing the slope of vehicle travel with one or more ramp slopes obtained from the map database.

6. The method of claim 1, wherein the determined vehicle location further comprises a height component.

7. The method of claim 1, further comprising the step of calibrating an accelerometer based on the up velocity component.

8. A vehicle comprising:
    a Global Navigation Satellite System (GNSS) including a GNSS receiver configured to receive a plurality of GNSS satellite signals with respect to the vehicle and to determine, based on the received GNSS signals, a location and a velocity of the vehicle, wherein the location includes latitude and longitude coordinates in a two-dimensional plane, and the velocity is a three-dimensional velocity vector having an up velocity component; and
    a microprocessor configured to:
    receive the vehicle location and the up velocity component, and by accessing a map matching module, identify a plurality of roads within a range of the vehicle location, at least one of which has a different elevation than the other road(s) and at least partially overlaps with at least one of the other road(s) in the two-dimensional plane at common latitude and longitude coordinates;
    detect a change in vehicle elevation based on a value of the up velocity component;
    determine a slope of the vehicle travel by calculating a three-dimensional displacement vector of the vehicle based on the three-dimensional velocity vector;
    determine which of the identified plurality of roads having common latitude and longitude coordinates the vehicle is traveling by comparing the slope of the vehicle to a slope for each of the identified plurality of roads;
    set a vehicle position in the vehicle GNSS based on the slope comparison; and
    provide navigational services to a vehicle occupant based on the set vehicle position.

9. The vehicle of claim 8 further comprising an accelerometer having a bias value that is calibrated based on the up velocity component.

* * * * *